US009485911B2

(12) United States Patent
Thorman et al.

(10) Patent No.: US 9,485,911 B2
(45) Date of Patent: Nov. 8, 2016

(54) MULTI-BLADE MOWER DECK WITH MULCH/SIDE DISCHARGE CONVERSION

(71) Applicant: Deere & Company, Moline, IL (US)

(72) Inventors: Christopher S. Thorman, Beaver Dam, WI (US); Ryan A. Fergus, Omro, WI (US); Earl E. Shore, Juneau, WI (US)

(73) Assignee: DEERE & COMPANY, Moline, IL (US)

( * ) Notice: Subject to any disclaimer, the term of this patent is extended or adjusted under 35 U.S.C. 154(b) by 635 days.

(21) Appl. No.: 13/871,553

(22) Filed: Apr. 26, 2013

(65) Prior Publication Data

US 2014/0318099 A1    Oct. 30, 2014

(51) Int. Cl.
*A01D 67/00*    (2006.01)
*A01D 42/00*    (2006.01)

(52) U.S. Cl.
CPC .................................. *A01D 42/005* (2013.01)

(58) Field of Classification Search
CPC .. A01D 34/71; A01D 34/005; A01D 34/667; A01D 34/49; A01D 42/005; A01G 1/125
USPC ........................................................ 56/320.2
See application file for complete search history.

(56) References Cited

U.S. PATENT DOCUMENTS

| | | | |
|---|---|---|---|
| 4,226,074 A | 10/1980 | Mullet et al. | |
| 5,179,823 A | 1/1993 | Pace | |
| 5,191,756 A | 3/1993 | Kuhn | |
| 5,205,112 A | 4/1993 | Tillotson et al. | |
| 5,465,564 A * | 11/1995 | Koehn ................. | A01D 34/005 56/13.6 |
| 5,499,494 A | 3/1996 | Boshell et al. | |
| 5,826,417 A | 10/1998 | Evans | |
| 5,845,475 A * | 12/1998 | Busboom ............. | A01D 34/005 56/17.4 |
| 6,330,783 B2 | 12/2001 | Oxley | |
| 6,609,358 B1 | 8/2003 | Schmidt et al. | |
| 6,848,246 B2 | 2/2005 | Samejima et al. | |
| 6,857,256 B2 | 2/2005 | Strange et al. | |
| 6,862,875 B2 | 3/2005 | Iida et al. | |
| 6,874,309 B1 | 4/2005 | Bellis, Jr. | |
| 6,910,324 B2 | 6/2005 | Kakuk | |
| 7,093,415 B2 | 8/2006 | Kallevig et al. | |
| 7,146,791 B2 | 12/2006 | Benway et al. | |
| 7,204,073 B1 | 4/2007 | Chenevert | |
| 7,337,602 B1 | 3/2008 | Butler et al. | |

(Continued)

FOREIGN PATENT DOCUMENTS

EP    1719403 A1    11/2006
EP    1776858 A1    4/2007

OTHER PUBLICATIONS

European Search Report issued in counterpart application No. 14165841.9, dated Sep. 2, 2014 (7 pages).

*Primary Examiner* — Thomas B Will
*Assistant Examiner* — Mai Nguyen

(57) ABSTRACT

A multi-blade mower deck with mulch/side discharge conversion includes a mulch gate mounted under the mower deck and connected to a vertical hinge under the mower deck. The mulch gate extends to the right and rearwardly around a portion of a perimeter of the right cutting chamber. A mulch gate lever on top of the mower deck is connected to the vertical hinge and pivots the mulch gate between the mulching position and a side discharge position. A baffle is removably attached under the mower deck and blocks a portion of a flow passage through the side skirt at the right of the right cutting chamber.

3 Claims, 9 Drawing Sheets

(56) References Cited

U.S. PATENT DOCUMENTS

| | | |
|---|---|---|
| 7,367,174 B2 | 5/2008 | Grimwade |
| 7,406,817 B2 | 8/2008 | Bledsoe |
| 7,448,195 B2 | 11/2008 | Kohler |
| 7,574,852 B1 | 8/2009 | Loxterkamp et al. |
| 7,624,562 B2 | 12/2009 | Kallevig et al. |
| 7,650,739 B2 | 1/2010 | Butler et al. |
| 7,677,022 B2 | 3/2010 | Chenevert et al. |
| 7,805,920 B2 | 10/2010 | Hurst et al. |
| 7,823,373 B1 | 11/2010 | Loxterkamp et al. |
| 8,104,255 B1 | 1/2012 | Hurst et al. |
| 8,156,722 B2 * | 4/2012 | Sugio ............... A01D 34/005 56/320.1 |
| 8,171,709 B1 * | 5/2012 | Bedford ............. A01D 34/005 56/320.2 |
| 2003/0154705 A1 * | 8/2003 | Sugden ............. A01D 34/685 56/320.1 |
| 2004/0006960 A1 * | 1/2004 | Samejima .......... A01D 34/71 56/14.7 |
| 2004/0255567 A1 * | 12/2004 | Kallevig ............ A01D 34/005 56/320.2 |
| 2007/0084176 A1 * | 4/2007 | Chenevert .......... A01D 42/005 56/320.1 |
| 2008/0047249 A1 * | 2/2008 | Davis ................. A01D 34/71 56/320.2 |
| 2009/0266043 A1 * | 10/2009 | Schick ............... A01D 34/71 56/13.8 |

* cited by examiner

MULTI-BLADE MOWER DECK WITH MULCH/SIDE DISCHARGE CONVERSION

FIELD OF THE INVENTION

This invention relates to mower decks and, more specifically, multi-blade mower decks with mulch/side discharge conversion.

BACKGROUND OF THE INVENTION

Multi-blade mower decks with mulch/side discharge conversion have been designed and offered as kits or original equipment for converting between side discharge and mulching positions. For example, mulch kits may include one or more baffles that may be installed under the deck. Some mower decks also include hinged baffles that may be pivoted between side discharge and mulching positions. For example, U.S. Pat. No. 6,609,358 entitled "Mower Having a Mower Deck Adapted for Selective Mulching or Non-Mulching Modes" relates to a multi-blade mower deck with hinged baffles that may pivot from a side discharge position to a mulching position.

However, there is a need for a multi-blade mower deck with mulch/side discharge conversion that is relatively quick and easy to install or remove as a kit, with fewer parts than existing devices. There also is a need for a multi-blade mower deck with mulch/side discharge conversion that is low in cost, and provides good side discharge and mulching capabilities.

SUMMARY OF THE INVENTION

A multi-blade mower deck with mulch/side discharge conversion includes a mulch gate and a baffle positioned adjacent each other under a mower deck. In a mulching position, the mulch gate and baffle block a flow path from the mower deck out a front right side of the mower deck. A handle on the mower deck may be used to move at least one of the mulch gate and the baffle between the mulching position and a side discharge position to partially open the flow path.

The multi-blade mower deck with mulch/side discharge conversion is relatively quick and easy to install or remove, has fewer parts than existing devices, is low in cost, and provides good side discharge and mulching capabilities.

DESCRIPTION OF THE PREFERRED EMBODIMENT

Figure 1:
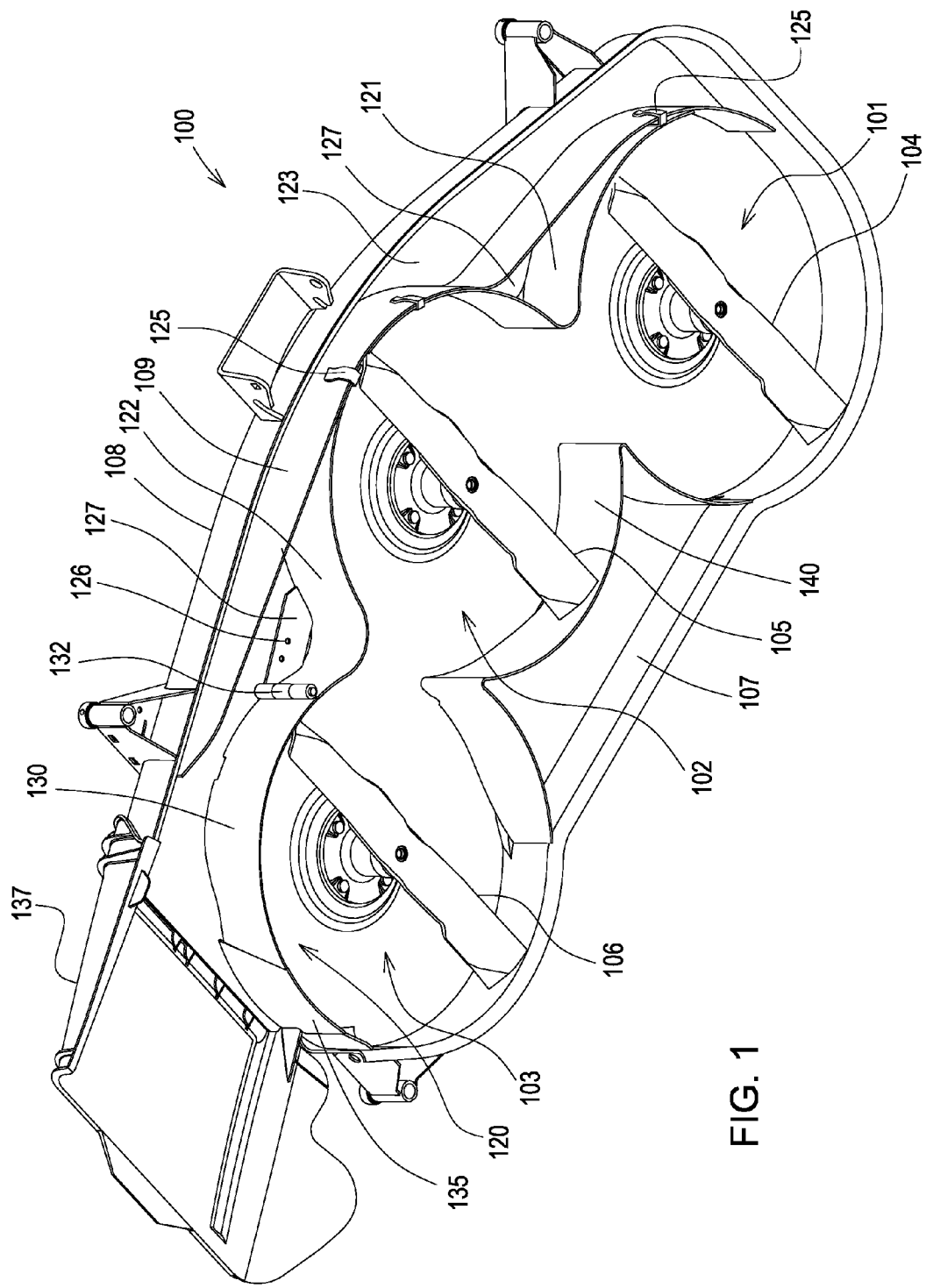
FIG. 1 is a bottom perspective view of a multi-blade mower deck with mulch/side discharge conversion according to a first embodiment of the invention, in a mulching position.
Figure 2:
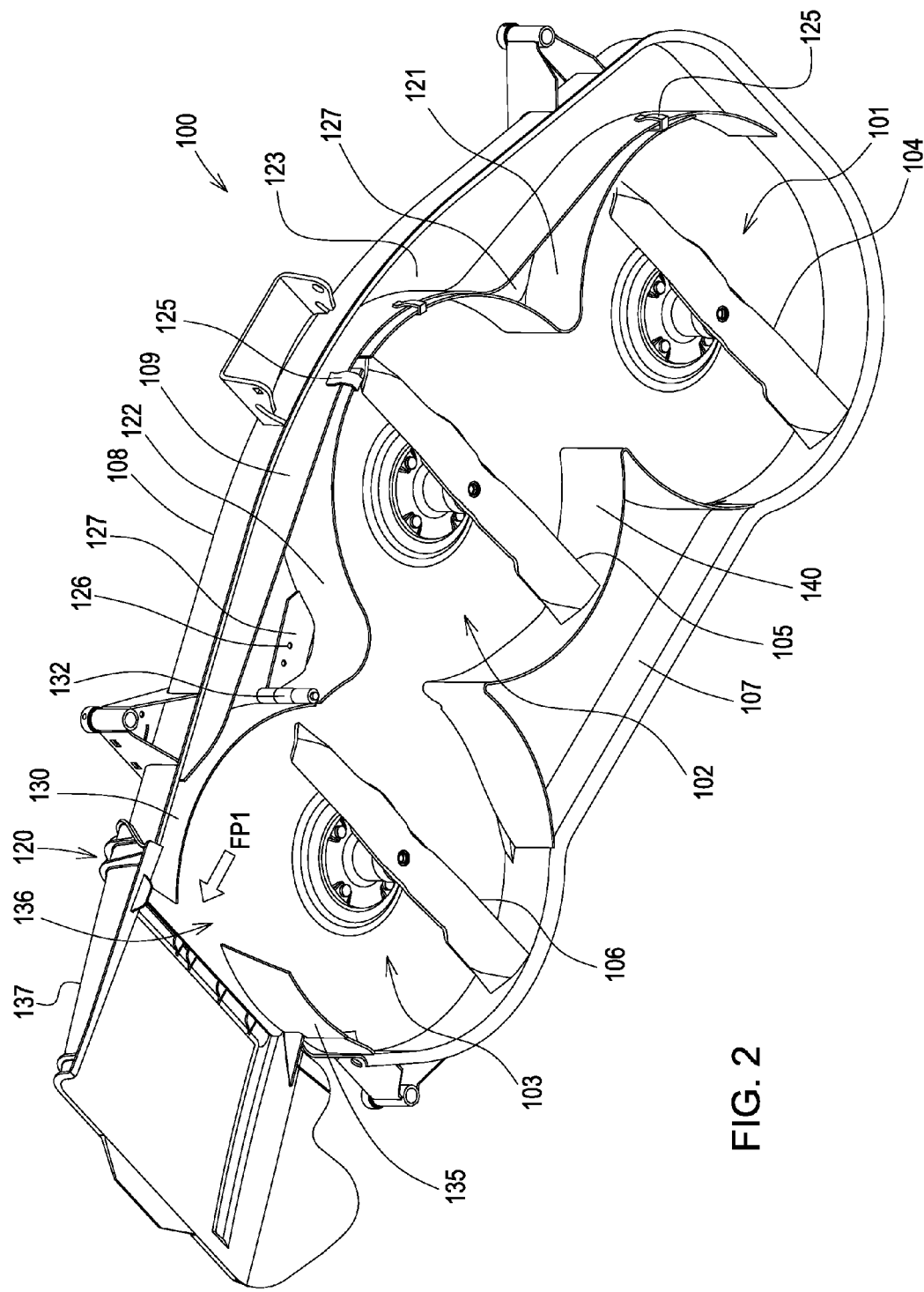
FIG. 2 is a bottom perspective view of a multi-blade mower deck with mulch/side discharge conversion according to a first embodiment of the invention, in a side discharge position.
Figure 3:
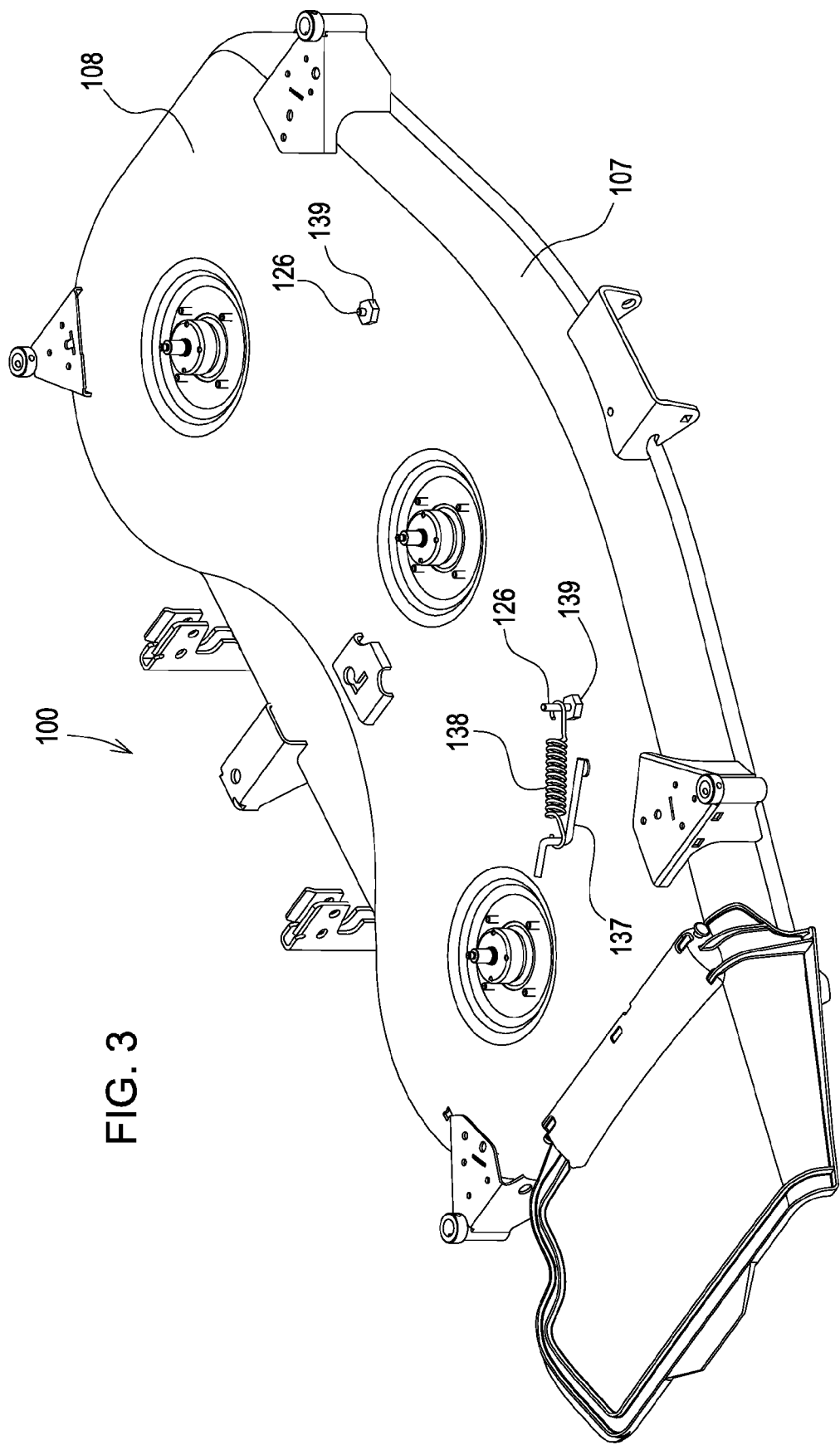
FIG. 3 is a top perspective view of a multi-blade mower deck with mulch/side discharge conversion according to a first embodiment of the invention.

In a first embodiment shown in FIGS. 1-3, multi-blade mower deck with mulch/side discharge conversion 100 may include three adjacent cutting chambers 101, 102, 103, with each cutting chamber covering or housing a rotary cutting blade 104, 105, 106. The cutting blades may be mounted and secured to the lower ends of generally vertically oriented spindles for rotation on vertical axes. The spindles may be rotated by one or more belts wound around pulleys attached to the upper ends of the spindles.

In a first embodiment, mower deck 100 may have skirt 107 extending downwardly around at least a portion of the outer periphery of top surface 108 of the mower deck. Vertical baffle 109 may be welded or otherwise attached to the underside of the mower deck forwardly of the cutting chambers at a location to the rear of the front skirt. Gauge wheels may be attached to the skirt and/or periphery of the mower deck to help prevent or minimize damage or scalping of the ground surface or turf when mowing.

In a first embodiment, mower deck 100 may provide mulch/side discharge conversion in the form of mulch kit 120. Mulch kit 120 may include left front deflector plate or baffle 121 and right front deflector plate or baffle 122. Each of the pair of front deflector plates or baffles may be releasably fastened and/or secured to the underside 123 of the mower deck. Each of the pair of front deflector plates or baffles may extend downwardly from the underside of the mower deck at least partially around the front of at least two of the cutting chambers. Alternatively, the pair of front deflector plates or baffles may be joined together to form a one-piece deflector plate. In the first embodiment showing a pair of front deflector plates, the left and right front deflector plates may abut each other or may be adjacent to each other at or near the front of cutting chamber 102.

In a first embodiment, mulch kit 120 also may include a plurality of clips 125 or other similar fasteners that may be welded or attached to each front deflector plate or baffle and may be spring biased to releasably hold each front deflector plate or baffle against or next to vertical baffle 109 or, alternatively, to the front skirt of the mower deck. Additionally, the mulch kit may include a plurality of threaded studs 126 that may be attached to or engaged to horizontal flanges 127 at the front of the deflector plate(s). Each threaded stud 126 may be used to secure a front deflector plate to the mower deck by inserting the threaded stud through a hole between the underside and top surface of the deck, and securing the threaded stud with a nut or fastener 139. The use of clips 125 minimizes the quantity of other hardware, e.g., threaded fasteners, sufficient to attach and secure each front deflector plate to the mower deck.

In a first embodiment, mulch kit 120 may include left front deflector plate or baffle 121 that extends down from the underside of the mower deck at least partially around the front of the perimeter of left cutting chamber 101, and at least partially around the front of the perimeter of center cutting chamber 102. Mulch kit 120 also may include right front deflector plate or baffle 122 that extends down from the underside of the mower deck partially at least partially around the front of the perimeter of center cutting chamber 102, and at least partially around the front of the perimeter of right cutting chamber 103. Each of the front deflector plates or baffles may have a curved or arced surface and may extend down from the underside of the deck to a horizontal plane below the plane of the cutting blades.

In a first embodiment, mulch kit 120 also may include baffle 135 that extends down from the underside of the mower deck at least partially closing the discharge chute at the right side of the perimeter of right cutting chamber 103. For example, baffle 135 may be removably secured to the underside of the mower deck baffle so that the baffle blocks that portion of the flow passage FP1 that is rearwardly of the spindle for cutting blade 106. Baffle 135 may be secured to the underside of the deck with a threaded stud.

In a first embodiment, mulch kit 120 may include mulch gate 130 which may be a hinged baffle attached to vertically oriented hinge 132 at the right edge of right front deflector plate or baffle 122. In the mulching position shown in FIG. 1, mulch gate 130 may extend at least partially around the front and right of the perimeter of the first or right cutting chamber 103. In the mulching position, mulch gate 130 may abut discharge chute baffle 135 on the side of the first or right cutting chamber, to close or block flow passage FP1 from the first or right cutting chamber out through an opening in side skirt 107 at the side of the mower deck and under side discharge deflector 137.

In a first embodiment, mulch kit 120 may include mulch gate 130 that may swing or pivot forwardly from the mulching position to the side discharge position adjacent front skirt 107 at the front of the mower deck, as shown in FIG. 2. In the side discharge position, flow passage FP1 is open from first or right cutting chamber 103 out through an opening in the side skirt at the side of the mower deck and under side discharge deflector 137. The open portion of flow passage FP1 may be between hinged baffle or mulch gate 130 and discharge chute baffle 135. Preferably, in the side discharge position, the open portion of flow passage FP1 may be limited to less than about 45 degrees around the circumference of the first or right cutting chamber. In both the mulching and the side discharge positions, mulch gate 130 may remain covered by and under the mower deck. Optionally, a discharge chute may be attached to the side of the mower deck for collection of grass clippings. The discharge chute also may include an impeller or fan.

In a first embodiment, mulch kit 120 may include front deflector plates or baffles 121, 122 that are configured and positioned to provide openings for grass clippings to move between each of the cutting chambers. The openings may be located between the front deflector plates and one or more baffles 140 at or adjacent the rear of the cutting chambers. The openings may promote flow of grass clippings from the left cutting chamber to the second or center cutting chamber, and from the second or center cutting chamber to the first or right cutting chamber. Preferably, the openings may be limited to less than about 45 degrees around the circumference of each cutting chamber.

In a first embodiment, mulch kit 120 may include mulch gate handle or lever 137 that an operator may use to open and close hinged baffle or mulch gate 130. The mulch gate lever may be located on top of the deck above the first or right cutting chamber and may be connected to and pivot on the vertical axis of hinge 132. The mulch gate lever may be biased to the mulching position and/or the side discharge position. For example, over center tension spring 138 may be attached between the mulch gate lever and fastener 139 on top of the mower deck, to urge the hinged baffle or mulch gate to either the mulching position or the side discharge position. An actuator also may be provided on the mower deck adjacent the mulch gate lever, and the actuator may be mechanically or electrically connected to a control in the vehicle's operator station so that a seated operator may pivot the mulch gate lever between a mulching position and a side discharge position.

Figure 4:
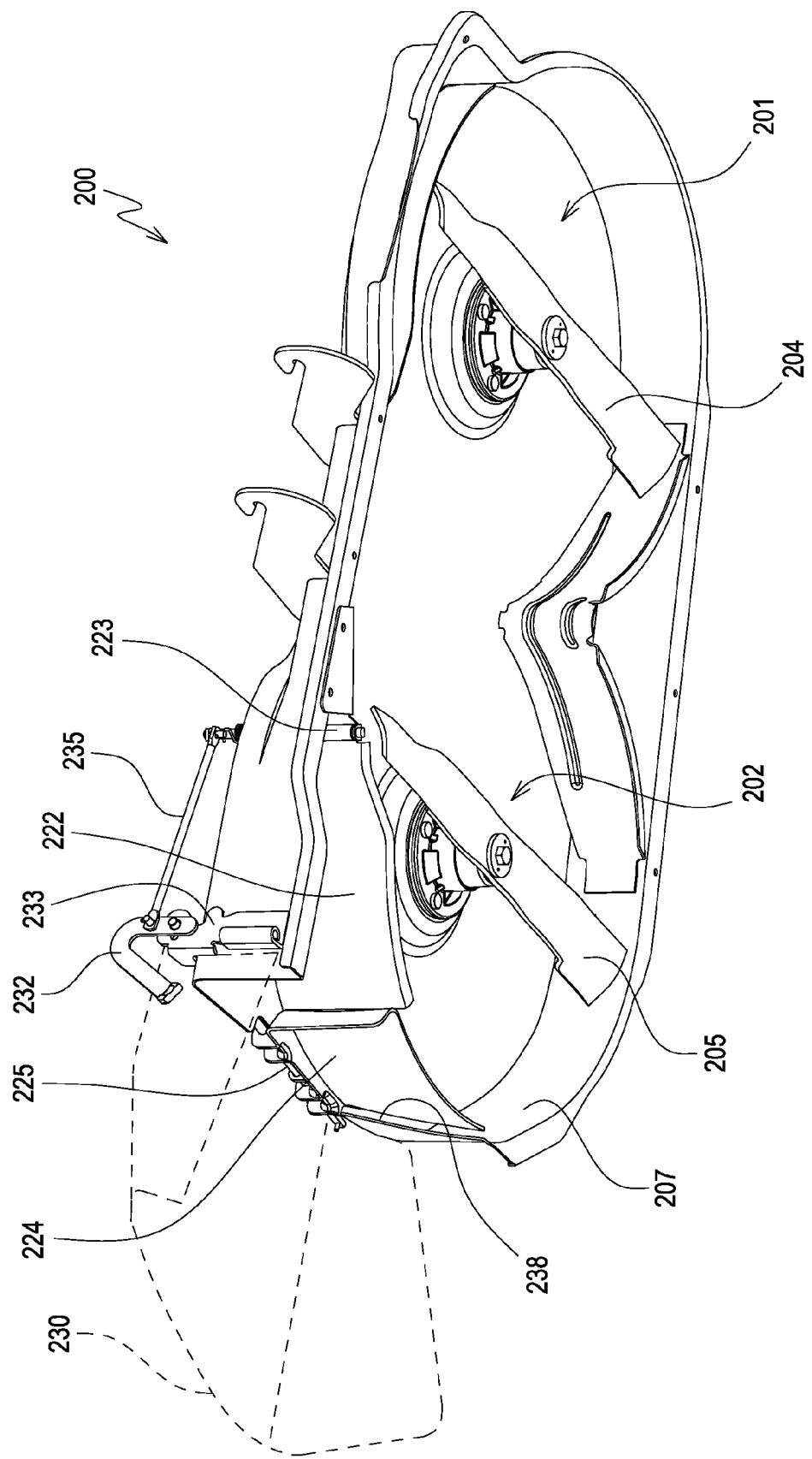
FIG. 4 is a bottom perspective view of a multi-blade mower deck with mulch/side discharge conversion according to a second embodiment of the invention, in a mulching position.
Figure 5:
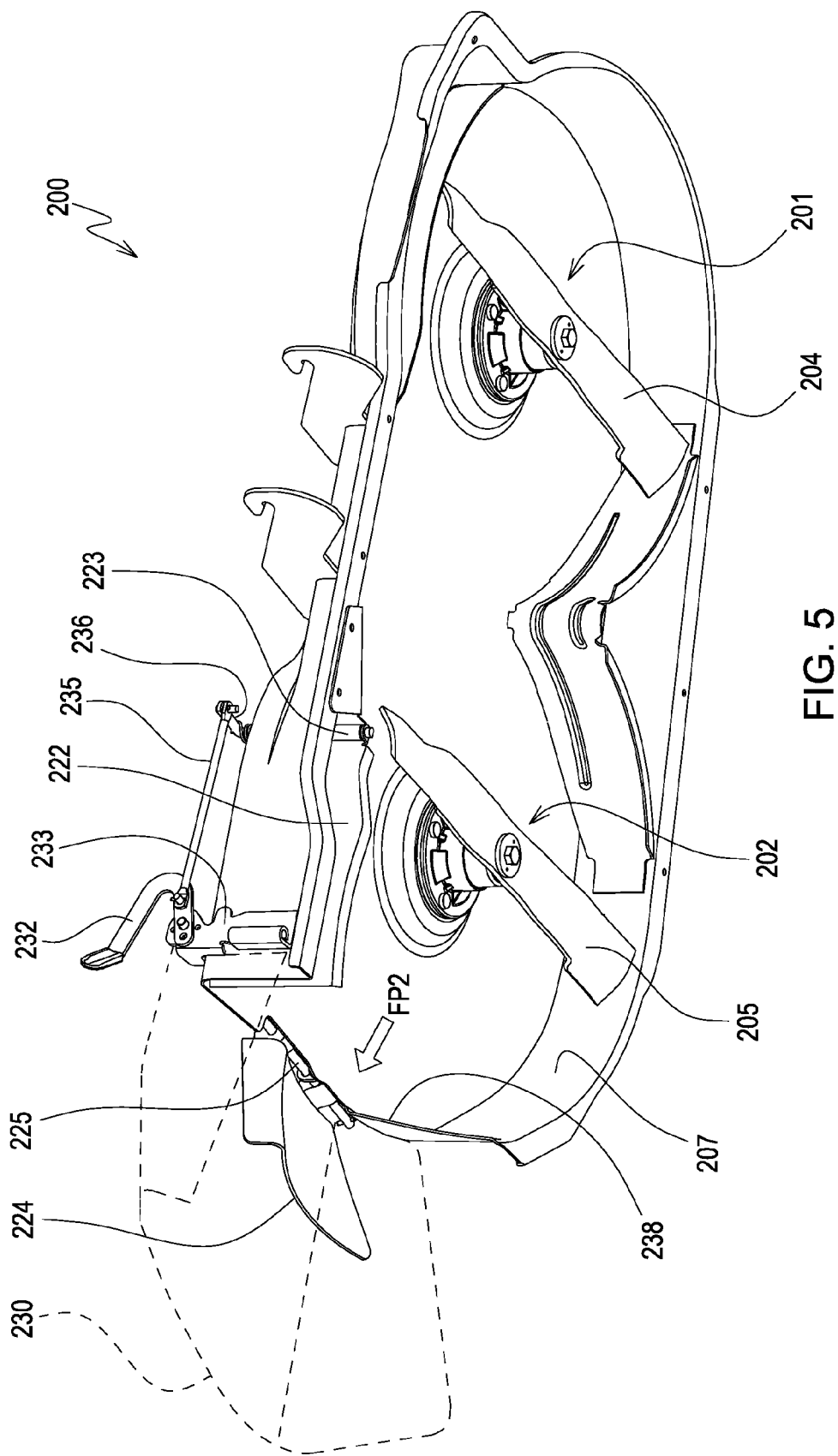
FIG. 5 is a bottom perspective view of a multi-blade mower deck with mulch/side discharge conversion according to a second embodiment of the invention, in a side discharge position.
Figure 6:
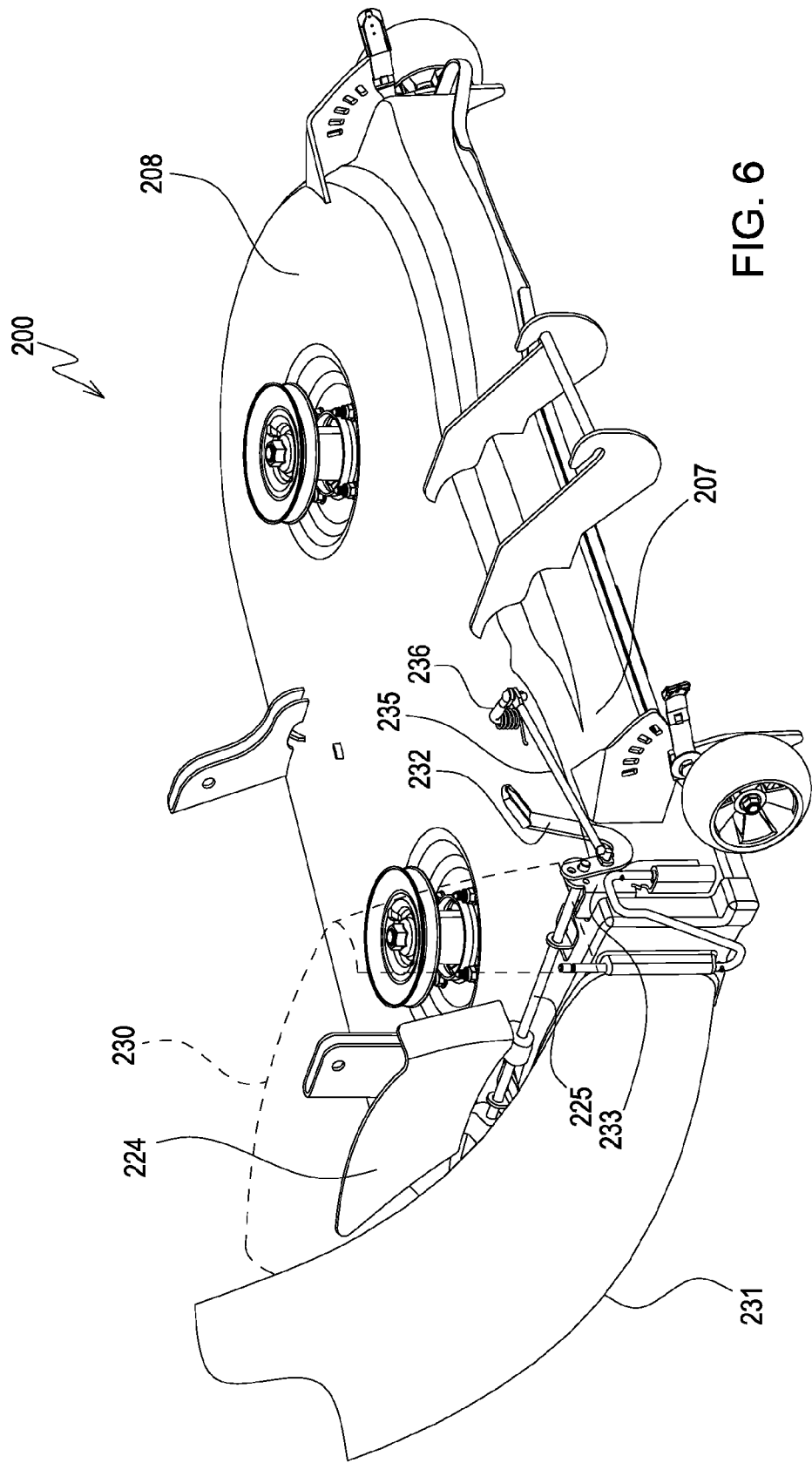
FIG. 6 is a top perspective view of a multi-blade mower deck with mulch/side discharge conversion according to a second embodiment of the invention, in a collection or bagging position.

In a second embodiment shown in FIGS. 4-6, multi-blade mower deck with mulch/side discharge conversion 200 may include adjacent cutting chambers 201, 202, with each cutting chamber covering or housing a rotary cutting blade 204, 205. An opening may be provided between the left and right cutting chambers. The cutting blades may be mounted and secured to the lower ends of generally vertically oriented spindles for rotation on vertical axes. The spindles may be turned by one or more belts wound around pulleys attached to the upper ends of the spindles.

In a second embodiment, mower deck 200 may have skirt 207 extending downwardly around at least a portion of the outer periphery of top surface 208 of the mower deck. Gauge wheels may be attached to the skirt and/or periphery of the mower deck to help prevent or minimize damage or scalping of the ground surface or turf when mowing.

In a second embodiment, mower deck 200 may include mulch gate 222 which may be a hinged or pivoting baffle attached to vertical hinge 223 under the mower deck adjacent a front or forward portion of the first or right cutting chamber. Additionally, in the mulching position of FIG. 4, baffle 224 may extend down from the underside of the mower deck at least partially closing the flow path FP2 at the side of the perimeter of the first or right cutting chamber 202. For example, in the mulching position of FIG. 4, baffle 224 may abut edge 238 of side skirt 207 on the side of the first or right cutting chamber, blocking that portion of the flow passage FP2 that is rearwardly of the spindle for cutting blade 205. In the mulching position, mulch gate 222 and baffle 224 may close or block flow passage FP2 from the first or right cutting chamber out through an opening in the side skirt from the mower deck and under side discharge deflector 230.

In a second embodiment, baffle 224 may pivot on horizontal hinge 225 from the mulching position of FIG. 4 to a side discharge position of FIG. 5. As shown in FIG. 5, mulch gate 222 may swing or pivot forwardly away from the middle of the first or right cutting chamber to a location adjacent front skirt 207 at the front of the mower deck. Optionally, baffle 224 may swing or pivot upwardly on a horizontal pivot axis that is perpendicular to the vertical pivot axis of mulch gate 222. Thus, in the side discharge position, flow passage FP2 may be opened from first or right cutting chamber 202 out through a side skirt of the mower deck and under side discharge deflector 230. Preferably, flow passage FP2 may be limited to less than about 45 degrees around the circumference of the first or right cutting chamber.

In a second embodiment, mower deck 200 may be operated with flow passage FP2 only partially open, by moving mulch gate 222 and baffle 224 to positions between the mulching position and the side discharge position. Additionally, as shown in FIG. 6, mower deck 200 may be operated with flow passage FP2 fully open and bagging chute 231 covering the opening in the side of the mower deck. To operate the mower deck in the collection or bagging position, mulch gate 222 may swing or pivot fully forward to a location adjacent front skirt 207 at the front of the mower deck, and baffle 224 may swing or pivot upwardly away from the first or right cutting chamber. Bagging chute 231 may then be attached and secured to the mower deck by engaging a flange or surface of the bagging chute between the top of the mower deck and a portion of the first mulch gate or horizontal hinge.

In a second embodiment, mower deck 200 may be moved between each position using mulch gate handle or lever 232 supported by bracket 233 attached to the skirt 207 on the side of the mower deck. Mulch gate handle or lever 232 may be a U-shaped lever having a first end engaged and secured to the hinge pin of horizontal hinge 225. A middle portion of mulch gate handle or lever 232 may be pivotably attached to rod or linkage 235. The rod or linkage may be pivotably attached to lever 236, which may be connected to the hinge pin of vertical hinge 223. The mulch gate handle may pivot the mulch gate and baffle at the same time between the mulching, side discharge and bagging positions. An actuator also may be provided on the mower deck adjacent the mulch gate handle, and the actuator may be mechanically or electrically connected to a control in the vehicle's operator station so that a seated operator may pivot the mulch gate handle between the mulching position, side discharge position, and collection or bagging position.

Figure 7:
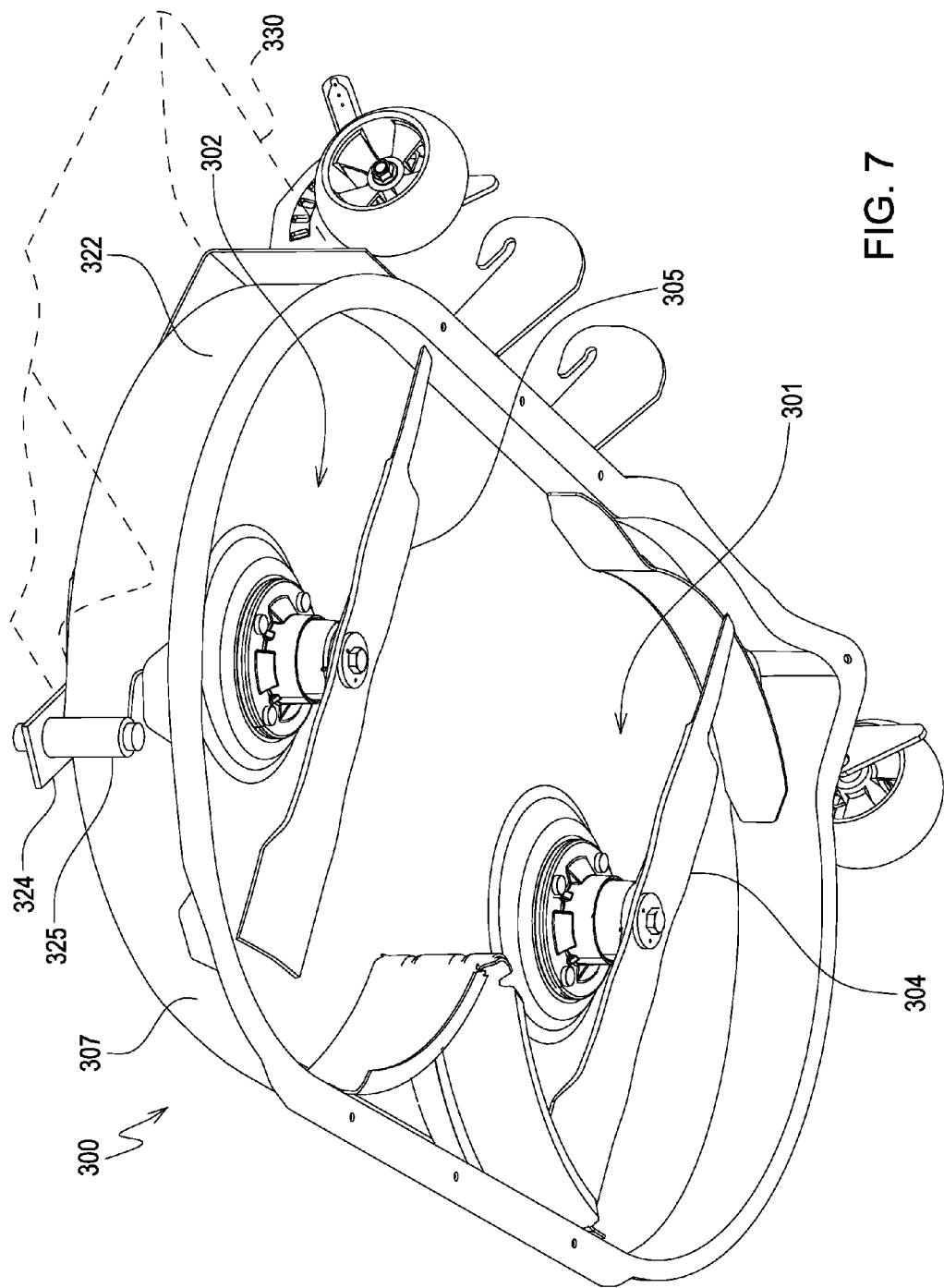
FIG. 7 is a bottom perspective view of a multi-blade mower deck with mulch/side discharge conversion according to a third embodiment of the invention, in a mulching position.
Figure 8:
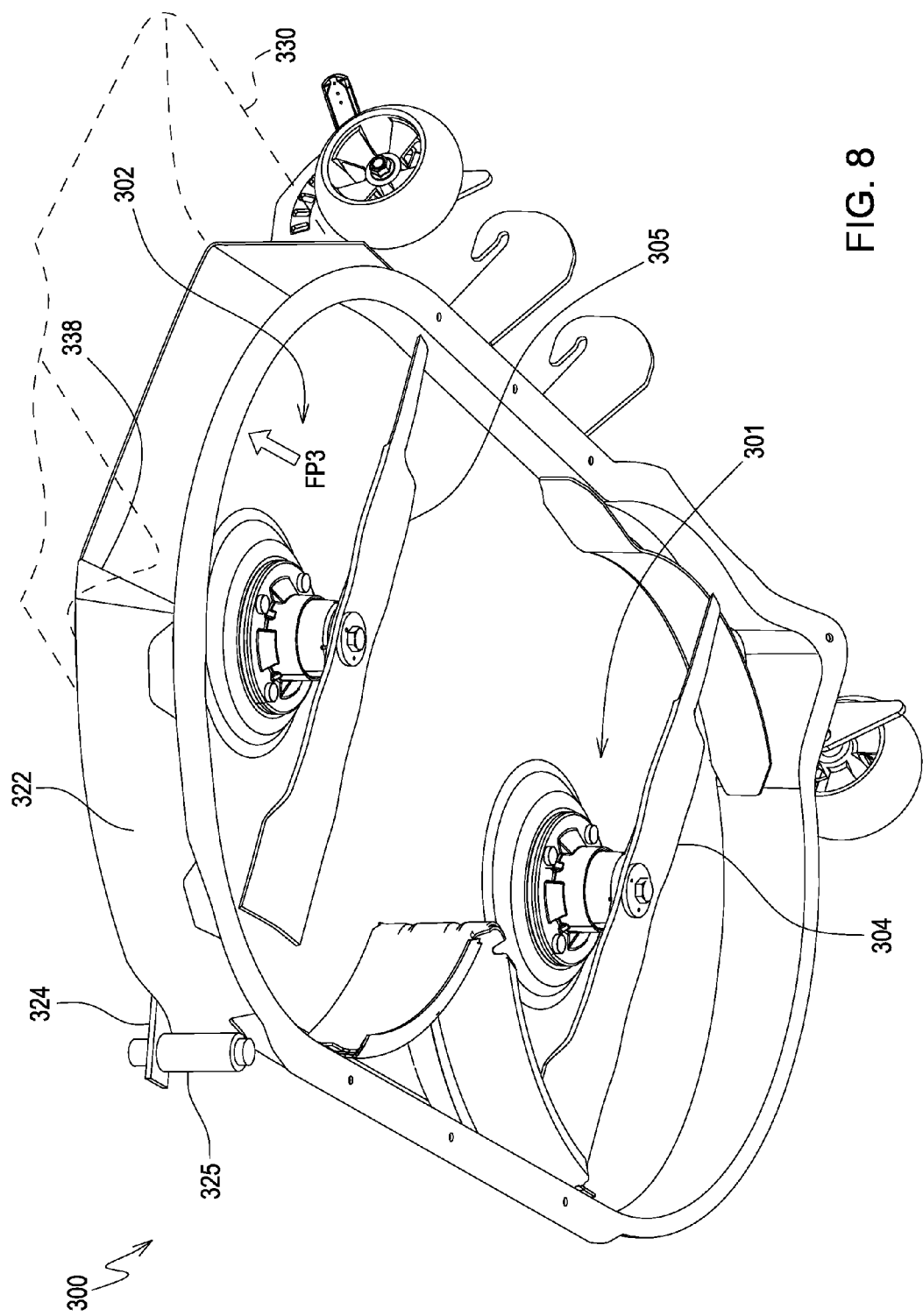
FIG. 8 is a top perspective view of a multi-blade mower deck with mulch/side discharge conversion according to a third embodiment of the invention, in a side discharge position.
Figure 9:
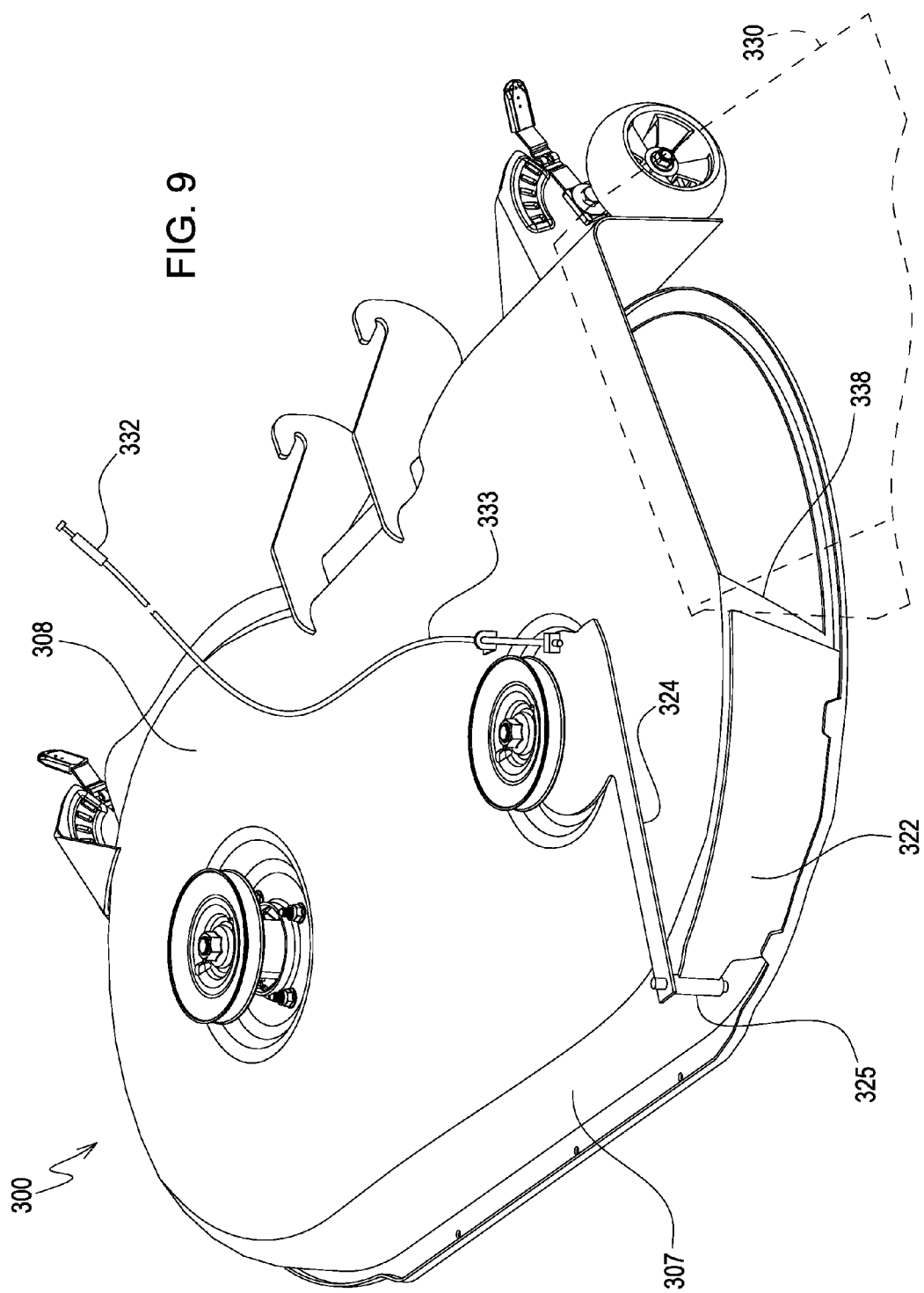
FIG. 9 is a top perspective view of a multi-blade mower deck with mulch/side discharge conversion according to a third embodiment of the invention, in a side discharge position.

In a third embodiment shown in FIGS. 7-9, multi-blade mower deck with mulch/side discharge conversion 300 may include adjacent cutting chambers 301, 302, with each cutting chamber covering or housing a rotary cutting blade 304, 305. An opening may be provided between the left and right cutting chambers. The cutting blades may be mounted and secured to the lower ends of generally vertically oriented spindles for rotation on vertical axes. The spindles may be turned by one or more belts wound around pulleys attached to the upper ends of the spindles.

In a third embodiment, mower deck 300 may have skirt 307 extending downwardly around at least a portion of the outer periphery of top surface 308 of the mower deck. Gauge wheels may be attached to the skirt and/or periphery of the mower deck to help prevent or minimize damage or scalping of the ground surface or turf when mowing.

In a third embodiment, mower deck 300 may include mulch gate 322. Mulch gate 322 may be a sliding baffle attached to pin or rod 325 at an outer end of pivot arm 324 at or adjacent the top 308 of the mower deck over the spindle in the first or right cutting chamber.

In a third embodiment, in the mulching position shown in FIG. 7, mulch gate 322 may extend at least partially around the front and side of the perimeter of first or right cutting chamber 302. In the mulching position, mulch gate 322 may slide generally horizontally to a position adjacent or abutting edge 338 of side skirt 307 on the side of the first or right cutting chamber. In the mulching position, the mulch gate may close or block flow passage FP3 from the first or right cutting chamber out from the mower deck under side discharge deflector 330.

In a third embodiment, in the side discharge position shown in FIG. 8, mulch gate 322 may slide horizontally rearwardly around the outer surface on the side of the perimeter of the first or right cutting chamber, to a location behind and adjacent the side of the first or right cutting chamber. In the side discharge position, flow passage FP3 is open from first or right cutting chamber 302 out from the mower deck under side discharge deflector 330. Preferably, flow passage FP3 may be limited to less than about 45 degrees around the circumference of the first or right cutting chamber. The mower deck with mulch/side discharge conversion may be operated with flow passage FP3 only partially open, by moving mulch gate 322 to a position between the mulching position and the side discharge position.

In a third embodiment, an actuator, lever or arm may be provided on the mower deck adjacent pivot member 324, and the actuator may be connected by Bowden cable 333 to control 332 in the vehicle's operator station so that a seated operator may move the pivot member between a mulching position and a side discharge position.

Having described the preferred embodiment, it will become apparent that various modifications can be made without departing from the scope of the invention as defined in the accompanying claims.

The invention claimed is:

1. A multi-blade mower deck with mulch/side discharge conversion, comprising:
    a mulch gate mounted under the mower deck and connected to a vertical hinge under the mower deck at the front of a first cutting chamber, the mulch gate extending rearwardly around a portion of a perimeter of the first cutting chamber to a location adjacent the first cutting chamber in a mulching position;
    a mulch gate lever on top of the mower deck and connected to the vertical hinge and pivoting the mulch gate between the mulching position and a side discharge position in which the mulch gate is under the mower deck and forwardly of the first cutting chamber; and
    a baffle mounted under the mower deck and extending forwardly from a location adjacent a side skirt of the first cutting chamber to a location forwardly of a cutting blade spindle in the first cutting chamber, the baffle blocking a portion of a flow passage through the side skirt of the first cutting chamber; and
    a spring biasing the mulch gate lever to the mulching position and to the side discharge position.

2. The multi-blade mower deck with mulch/side discharge conversion of claim 1 further comprising a deflector plate removably secured under the mower deck forwardly of a second cutting chamber and a third cutting chamber.

3. A multi-blade mower deck with mulch/side discharge conversion, comprising:
    a front deflector plate removably attached under a mower deck and extending partially around a front of a plurality of cutting chambers;
    a mulch gate at an end of the front deflector plate; the mulch gate pivotable between a mulching position blocking a flow passage from one of the cutting chambers out through an opening in a side skirt of the mower deck, and a side discharge position partially opening the flow passage; and,
    a removable baffle partially blocking the flow passage; and
    a mulch gate handle above the mower deck and connected to the mulch gate; the mulch gate handle biased to the mulching position and to the side discharge position.

* * * * *